United States Patent
Molitor et al.

(10) Patent No.: US 11,715,270 B2
(45) Date of Patent: Aug. 1, 2023

(54) METHODS AND SYSTEMS FOR CUSTOMIZING AUGMENTATION OF A PRESENTATION OF PRIMARY CONTENT

(71) Applicant: Verizon Patent and Licensing Inc., Basking Ridge, NJ (US)

(72) Inventors: Duane Burton Molitor, Frisco, TX (US); Denny Breitenfeld, Florham Park, NJ (US); Vidhya Seran, Irving, TX (US); Elena Dotsenko, Princeton, NJ (US); Eric Norman Azares, Cary, NC (US); Kevin M. Byrd, Carmel, IN (US); Jeremy E. Hampsten, Gilbert, AZ (US); Robert Strelec, Madison, NJ (US); Timothy Atchley, Burke, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/474,778

(22) Filed: Sep. 14, 2021

(65) Prior Publication Data

US 2023/0083884 A1   Mar. 16, 2023

(51) Int. Cl.
| | | |
|---|---|---|
| *G06F 3/04815* | (2022.01) | |
| *G06V 20/20* | (2022.01) | |
| *H04L 67/131* | (2022.01) | |
| *G06T 19/00* | (2011.01) | |

(52) U.S. Cl.
CPC ........ *G06T 19/006* (2013.01); *G06F 3/04815* (2013.01); *G06V 20/20* (2022.01); *H04L 67/131* (2022.05)

(58) Field of Classification Search
CPC ... G06T 19/006; G06F 3/04815; G06V 20/20; H04L 67/131
See application file for complete search history.

(56) References Cited

U.S. PATENT DOCUMENTS

| | | | |
|---|---|---|---|
| 10,078,917 B1* | 9/2018 | Gaeta | G06F 3/04815 |
| 2013/0196772 A1* | 8/2013 | Latta | G06T 19/006 463/42 |
| 2013/0342564 A1* | 12/2013 | Kinnebrew | G09G 3/003 345/619 |
| 2014/0247281 A1* | 9/2014 | Ellenby | G06T 19/006 345/633 |
| 2018/0352272 A1* | 12/2018 | Breitenfeld | H04N 21/8146 |
| 2019/0102946 A1* | 4/2019 | Spivack | G06T 19/003 |
| 2019/0353904 A1* | 11/2019 | Ardovino | G06F 3/013 |

* cited by examiner

*Primary Examiner* — Jitesh Patel

(57) ABSTRACT

An illustrative content augmentation system identifies a presentation context dataset indicating how an extended reality (XR) presentation device is to present XR content in connection with a presentation of primary content. Based on the presentation context dataset, the content augmentation system selects a subset of secondary content items from a set of secondary content items each configured for presentation as XR content that augments the presentation of the primary content. The content augmentation system also provides the selected subset of secondary content items for presentation by the XR presentation device in connection with the presentation of the primary content. Corresponding methods and systems are also disclosed.

20 Claims, 9 Drawing Sheets

METHODS AND SYSTEMS FOR CUSTOMIZING AUGMENTATION OF A PRESENTATION OF PRIMARY CONTENT

BACKGROUND INFORMATION

Various types of extended reality (XR) technologies are being developed, deployed, and used by users to engage in various types of XR experiences. As one example, virtual reality (VR) technologies provide VR experiences whereby users become fully immersed in a VR world in which they can move about within virtual spaces and see, hear, and/or interact with virtual objects and/or virtual avatars of other users in ways analogous to real-world experiences. As another example, augmented reality (AR) technologies (also referred to as mixed reality technologies) provide AR experiences whereby users continue to experience the real world around them to at least some extent (e.g., seeing real objects in their environment by way of a partially transparent heads-up display, video passed through from a head-mounted camera, etc.) while also being presented with virtual elements and augmentations that do not exist in the real world. For instance, virtual objects or characters may be presented as part of an AR game or other entertainment application, virtual instructions or illustrations may be presented as part of an AR educational application, or the like.

In general, extended reality content is distributed and experienced in an independent and standalone manner analogous to traditional types of content. For example, just as conventional video games, video content (e.g., movies, television shows, etc.), live performances (e.g., plays, concerts, etc.), and so forth may be distributed (e.g., purchased, downloaded, broadcast, performed, etc.) and experienced (e.g., watched, played, etc.) independently from other content, XR applications (e.g., AR/VR games or programs, etc.) are generally distributed and experienced as standalone applications independent from other applications and/or types of content.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
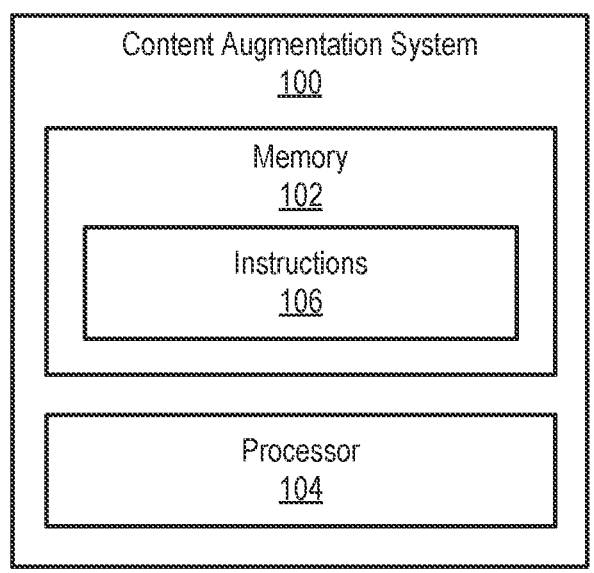
FIG. 1 shows an illustrative content augmentation system configured to customize augmentation of a presentation of primary content in accordance with principles described herein.

Methods and systems for customizing augmentation of a presentation of primary content are described herein. As mentioned above, extended reality (XR) content such as augmented reality (AR) content and virtual reality (VR) content has generally been distributed and experienced in a standalone manner. This is similar to more conventional types of content such as video games, movies, television shows, plays, concerts, and so forth, which are also generally designed, sold, and viewed or played individually (e.g., such that one may choose to watch a movie or play a video game or attend a concert but probably would not do more than one of these at the same time). As will be described in detail herein, however, certain types of XR content may be configured to augment the experience of a user (e.g., a viewer, a player, etc.) with any of these other types of media. For example, XR content may be tagged or otherwise associated with conventional forms of media content such as video content, live content performed in person ("live performance" of content), and the like.

As one example, video content (e.g., a television program or movie) broadcast to a plurality of users will be considered. Together with the broadcast of the video content, a content provider (e.g., a server system) may also broadcast data representative of various types of XR content that is associated with the video content. For instance, time codes in the XR content may be correlated with time codes in the video content such that certain augmentations are presented during and in connection with the presentation of the video content. Such simultaneous broadcasting (or narrowcasting in certain examples) of both the video content and the associated XR content may be referred to as simulcasting of the XR content with the video content. As another example, a live performance of content (e.g., a play or concert, a live presentation in a classroom setting or auditorium, etc.) presented to a plurality of users will be considered. In this example, there is not content data that is simulcast with associated XR content (since the content is a live performance), but the same principles of XR content being tagged to or otherwise correlated with the live performance may be in play to allow for XR content to be presented during and in connection with the presentation of the live performance content.

In both of these examples, a presentation of what will be referred to herein as "primary content" (e.g., the broadcast video content, the live performance content, another instance of content that is to be augmented in the ways described herein, etc.) may be merged with XR content that is configured to be presented in connection with the presentation of the primary content. As used herein, XR content may be presented "in connection with" a presentation of primary content when the XR content is related and/or correlated to the primary content in some way and is presented concurrently with the presentation of the primary content. For example, as will be described and illustrated in more detail below, XR content related and/or correlated to primary content such as a sporting event broadcast (e.g., the championship of the National Football League) may include augmentations that relate to the program (e.g., a static title or logo for the broadcast, a picture of a football, etc.), augmentations synchronized to the video content (e.g., dynamic 3D model of players on the field provided during an instant replay, options for different camera angles or commentary for the game as it proceeds, etc.), and any other augmentations as may augment the sporting event in a particular example.

Unlike many types of primary content, which may be presented and experienced in shared ways (e.g., on a shared device such as a large television presenting video content, on a stage on which a live performance is being performed, etc.), XR content may be experienced solely or most optimally on personal devices (e.g., head-mounted XR presentation devices, mobile devices that overlay augmentations onto real-time camera footage as users freely point the mobile devices in different directions, etc.). Additionally, different users with different preferences may use different types of devices with different capabilities and in different circumstances to experience XR content presented in connection with primary content. Systems and methods described herein may be configured to customize how an XR presentation device presents XR content in connection with primary content based on various types of information relating to the user and his or her preferences, the XR presentation device and its capabilities, the environment in which the user is experiencing the XR content, and other factors. These various types of information may be determined by an XR presentation device used by the user and represented in a dataset referred to herein as a presentation context dataset. As will be described in more detail below, presentation context datasets may represent any information (including the examples mentioned above) as may relate to the context in which XR content is presented and how an XR presentation device is to present the XR content in connection with primary content.

Accordingly, different instances of XR content configured in different ways and/or for different contexts (e.g., formatted for different types of devices, having different resolutions, configured to be placed in different parts of a room, associated with different content ratings that may or may not be suitable for children, etc.) may be provided to customize augmentation of a presentation of primary content based on a particular presentation context dataset. Such instances of XR content will be referred to herein as secondary content items and will be understood to include any static two-dimensional (2D) or three-dimensional (3D) imagery or objects, dynamic 2D or 3D video segments, static or animated volumetric models (e.g., models of characters from the primary content that emerge from the primary content to move around in the environment with the user, etc.), and/or any other suitable content instances as may be provided to augment the presentation of primary content in any manner as may serve a particular implementation.

Content providers and users of primary and/or XR content may benefit from the customized merging of primary and XR content in the ways described herein. For example, people with different tastes and/or preferences (e.g., an adult and a child) may experience a presentation of primary content together but in a way that is uniquely customized for their different tastes, abilities, and/or preferences (e.g., providing advanced statistics and commentary of a football game to the adult while providing cartoon-based summaries of major game events to a child to help him or her understand the complexities of the game). At the same time, content providers may be enabled to make their content more relevant and appealing to various segments of the market, thereby providing competitive advantages and additional room to improve the content they provide and/or the amount of interest the content generates.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for customizing augmentation of a presentation of primary content may provide any of the benefits mentioned above, as well as various additional and/or alternative benefits that will be described and/or made apparent below.

FIG. 1 shows an illustrative content augmentation system 100 configured to customize augmentation of a presentation of primary content in accordance with principles described herein. System 100 may be implemented by computer resources such as processors, memory facilities, storage facilities, communication interfaces, and so forth. In some examples, system 100 may be partially or fully implemented by user equipment (UE) devices and/or devices configured to support these UE devices (e.g., modems or routers, set top boxes, etc.). Such UE devices may include XR presentation devices (e.g., hand-held devices, head-mounted devices, etc.), mobile devices (e.g., smartphones, tablet devices, etc.), personal computers, smart televisions, and/or other suitable equipment used by end users. Additionally or alternatively, system 100 may be partially or fully implemented by computing systems that are located remotely from users and/or accessed by a plurality of UE devices (e.g., by way of supporting devices), such as distributed computing systems operated by a cellular data provider (e.g., multi-access edge compute (MEC) systems), distributed computing systems operated by a cloud-computing provider (e.g., multi-access cloud compute systems), or other suitable server systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with customizing augmentation of a presentation of primary content as described herein and/or as may serve a particular implementation.

Figure 2:
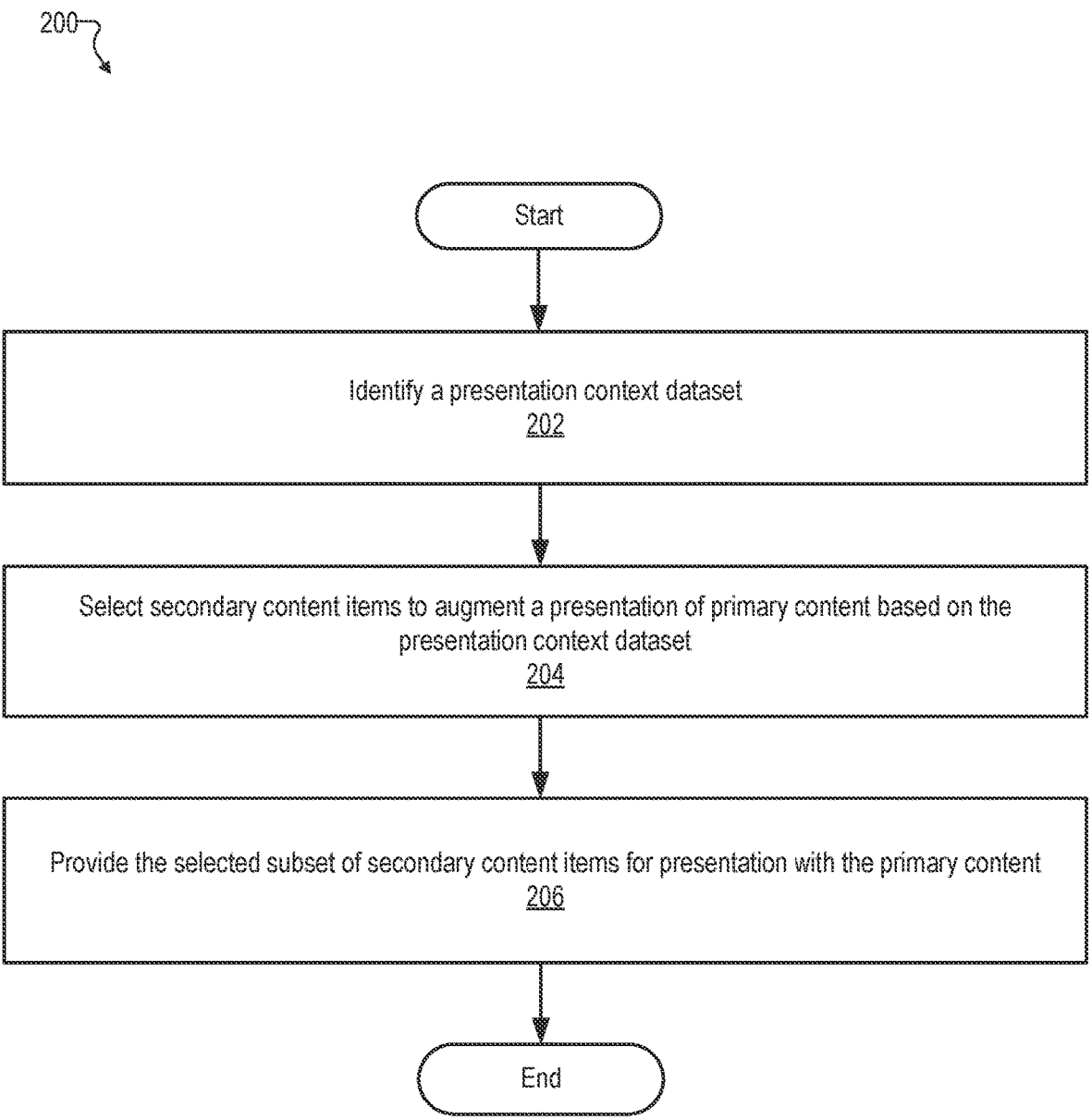
FIG. 2 shows an illustrative content augmentation method for customizing augmentation of a presentation of primary content in accordance with principles described herein.

As one example of functionality that processor 104 may perform, FIG. 2 shows an illustrative content augmentation method 200 for customizing augmentation of a presentation of primary content in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a content augmentation system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by system 100 (e.g., by processor 104 executing instructions 106 stored in memory 102).

At operation 202, system 100 may identify a presentation context dataset. For example, as described above, the presentation context dataset may indicate, in any suitable way, how an XR presentation device is to present XR content in connection with a presentation of primary content. In examples in which system 100 is implemented locally (e.g., by the XR presentation device itself or a supporting device such as a smart router or set top box), the presentation context dataset may be identified at operation 202 by directly determining the presentation context dataset (e.g., by detecting various context data and generating the presentation context dataset based on the detected context data). In contrast, in examples in which system 100 is implemented remotely from the XR presentation device (e.g., within an XR system communicatively coupled to the XR presentation device by way of a network), the identifying of the presentation context dataset at operation 202 may be performed by receiving the presentation context dataset from the XR presentation device (which may determine and/or store the presentation context dataset and provide it to the XR system upon request). Implementations illustrating both of these possibilities will be described and illustrated below, as will various examples of information that may be included in the presentation context dataset to indicate how the XR presentation device is to present the XR content in connection with the presentation of the primary content.

At operation 204, system 100 may select a subset of secondary content items from a set of secondary content items. Each secondary content item in the set of secondary content items may be configured for presentation as XR content that augments the presentation of the primary content. For example, each secondary content item may relate to and/or be correlated to (e.g., synchronized to, configured for presentation with, etc.) the primary content. However, each secondary content item in the set may not necessarily be relevant to the XR presentation device that is to present the XR content and/or to the user to whom the XR content is to be presented. For example, certain secondary content items in the set may be formatted for other types of XR presentation devices or devices with other capabilities (e.g., devices that use a different screen resolution, devices that include two stereoscopic screens embedded in a head-mounted display instead of a single screen embedded in a hand-carried device, etc.). Other secondary content items may be incompatible for certain types of users (e.g., children's content that is unsuitable for adults or vice versa, etc.) or for certain environments in which the user experiences the XR content (e.g., environments lacking enough space for a certain secondary content item to be properly presented, etc.). Accordingly, system 100 may select the subset of secondary content items at operation 204 based on the presentation context dataset to compile a group of secondary content items that may be more limited than the full set, but that are each relevant to the specific presentation context as represented in the presentation context dataset identified at operation 202 (e.g., for the particular device, user, environment, etc.).

In examples in which system 100 is implemented locally (e.g., by the XR presentation device itself or a supporting device), system 100 may receive a non-custom stream from an XR system that includes the entire set of secondary content items such that system 100 may perform the selecting of operation 204 locally. In this way, different implementations of system 100 may select different subsets of secondary content items based on their own respective presentation context datasets. In contrast, in examples in which system 100 is implemented remotely from the XR presentation devices (e.g., within an XR system communicatively coupled to the XR presentation devices by way of a network), different subsets of secondary content items may be selected by the XR system for different XR presentation devices and these different subsets may be transmitted in respective custom streams to each of the XR presentation devices without other non-selected (e.g., non-relevant) secondary content items from the full set. Implementations illustrating both of these possibilities will be described and illustrated below, as will various examples of secondary content items that may be selected for the respective subset to be presented by each XR presentation device in each different presentation context.

At operation 206, system 100 may provide the selected subset of secondary content items for presentation by the XR presentation device in connection with the presentation of the primary content. As has been mentioned, in certain examples, the primary content may be provided together with the selected subset of secondary content items, while in other examples this may not be the case (e.g., if the primary content is a live performance or if system 100 is implemented locally on the client side rather than on the server side). In examples in which system 100 is implemented client side (e.g., by the XR presentation device itself or a supporting device), system 100 may perform operation 206 by providing the selected subset of secondary content items to a display device of the XR presentation device. For example, the display device may be integrated with or connected to other parts of the XR presentation device and may include a screen on which the XR content of the selected secondary content items is presented. In contrast, in examples in which system 100 is implemented server side (e.g., within an XR server system remote from and communicatively coupled to the XR presentation device), system 100 may perform operation 206 by transmitting the selected secondary content items to the XR presentation device for the XR presentation device to present (e.g., by transmitting the XR custom streams described above). Implementations illustrating both of these possibilities will be described and illustrated below, as will various examples of how selected secondary content items may be presented in connection with the presentation of primary content.

While method 200 is framed in terms of an individual XR presentation device providing an individual presentation context dataset such that system 100 selects an individual subset of secondary content items for presentation by the XR presentation device, it will be understood that multiple devices, including multiple devices in the same room and/or presenting the same primary content, may present different subsets of secondary content items customized to the devices based on their own unique capabilities and circumstances (e.g., based on their own presentation context datasets). Accordingly, along with the operations described above in relation to method 200, system 100 may further be configured to perform operations including, for example: 1) identifying an additional presentation context dataset indicating how an additional XR presentation device is to present XR content in connection with the presentation of the primary content (where the additional XR presentation device is co-located with the XR presentation device such that users of both the XR presentation device and the additional XR presentation device concurrently view the presentation of the same primary content); 2) selecting, based on the additional presentation context dataset, an additional subset of secondary content items from the set of secondary content items (where the additional subset of secondary content items is different from the subset of secondary content items in accordance with a difference between the presentation context dataset and the additional presentation context dataset); and 3) providing the additional selected subset of secondary content items for presentation by the additional XR presentation device in connection with the presentation of the primary content. Examples of implementations involving multiple XR presentation devices co-located so as to allow their users to share an XR experience (e.g., concurrently viewing the presentation of the same primary content while each being presented customized XR content) will be illustrated below in at least FIGS. 4, 5, and 7.

Figure 3:
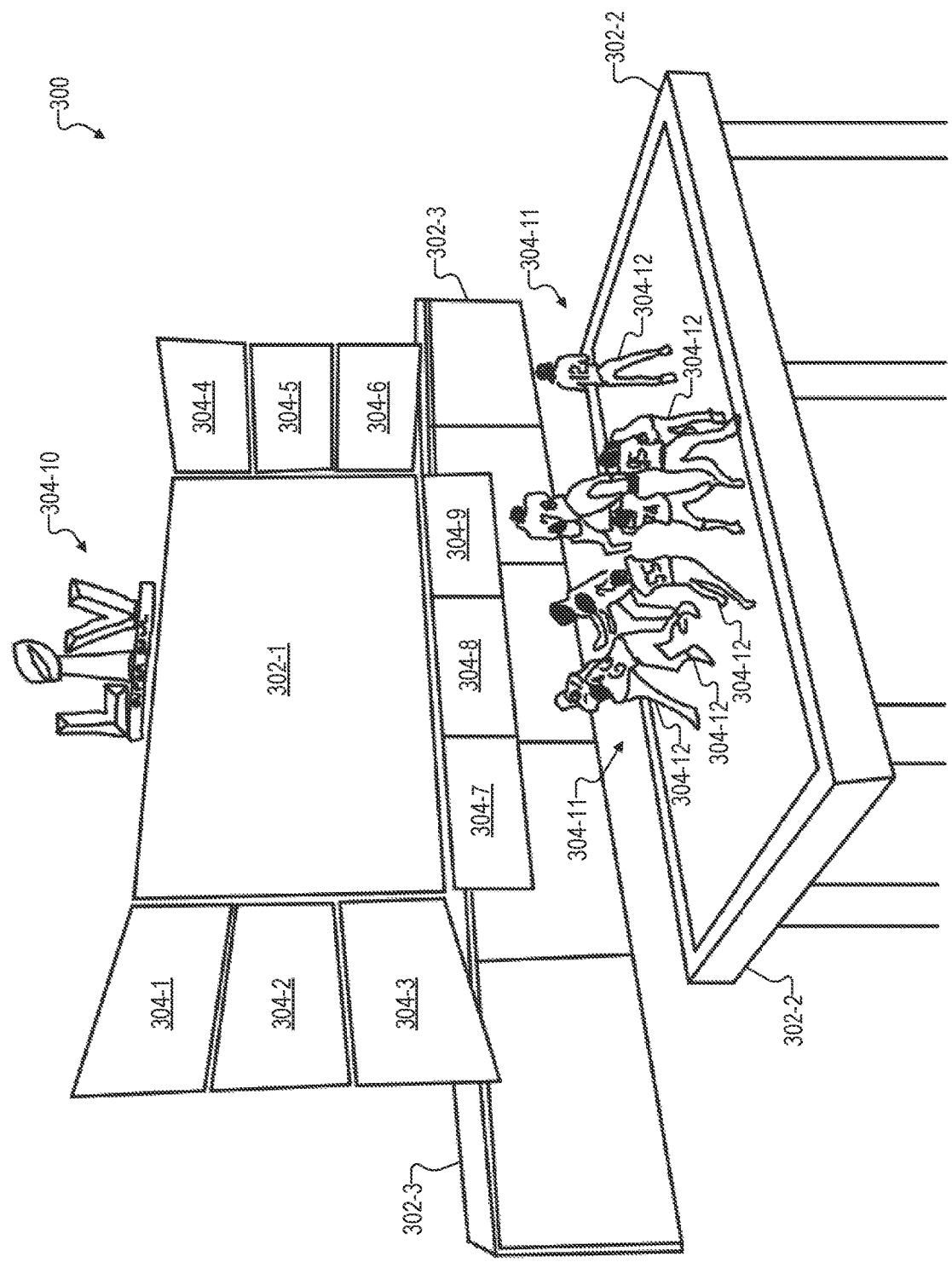
FIGS. 3-4 show illustrative extended reality (XR) experiences whereby customized augmentation of different primary content presentations are provided by implementations of the content augmentation system of FIG. 1 in accordance with principles described herein.
Figure 4:
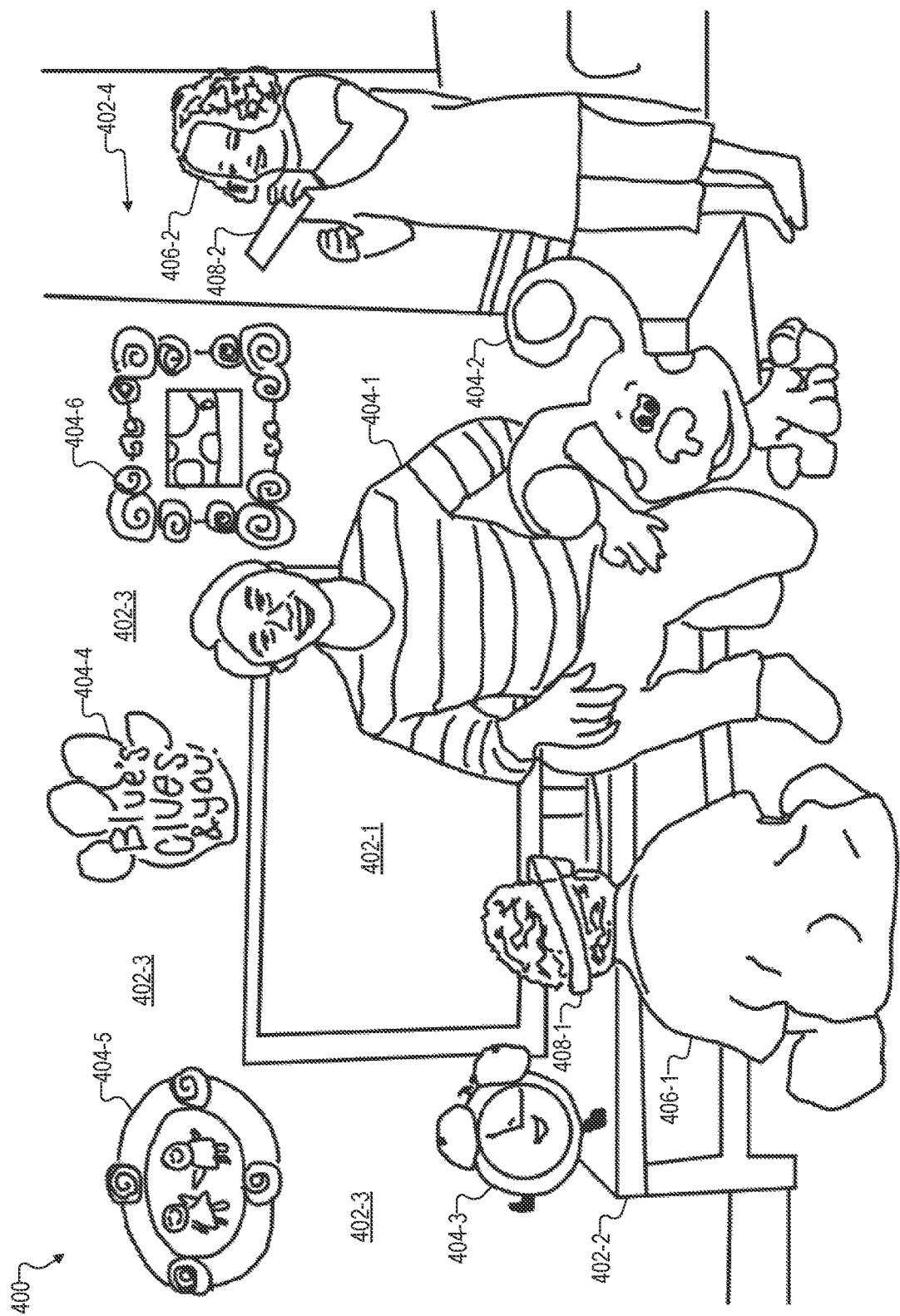

FIGS. 3-4 show illustrative experiences whereby customized augmentations of different primary content presentations are provided by implementations of system 100 in accordance with principles described herein. More specifically, FIG. 3 shows a sporting event experience 300 in which the primary content being presented is a particular televised football game (the championship game of the National Football League), while FIG. 4 shows a television show experience 400 in which the primary content being presented is a children's television show ("Blues Clues"). As will now be described in more detail, experiences 300 and 400 each depict an augmented view of the world that includes a mix of both real elements (e.g., real-world objects, elements of the real-world scene, etc.) and virtual elements (e.g., virtual objects and augmentations that are not actually present in the real-world scene but presented by an XR presentation device as if they were present).

Sporting event experience 300 in FIG. 3 is shown to include a plurality of real elements 302 (e.g., real elements 302-1 through 302-3) integrated with a plurality of virtual elements 304 (e.g., virtual elements 304-1 through 304-12) that will be understood to be visibly and audibly presented to a user viewing the world by way of a particular XR presentation device. For instance, virtual elements 304 may be XR content that is presented in connection with the presentation of primary content (the televised sporting event in this example) and that implements the selected subset of secondary content items that an implementation of system 100 may provide in accordance with method 200.

As shown, a real-world television implements real element 302-1, a real-world coffee table in front of the television implements real element 302-2, and a piece of real-world furniture supporting the television implements real element 302-3. While not explicitly shown in FIG. 3, it will be understood that primary content (e.g., the televised sporting event mentioned above or other suitable content) may be presented on the television screen. As such, people in the room with and without XR presentation devices may be able to watch the primary content on the television, though only users of XR presentation devices may be enabled to experience (e.g., see, hear, interact with, etc.) the various virtual elements 304 augmenting the presentation of the primary content.

As further shown in FIG. 3, sporting event experience 300 augments the presentation of the televised primary content on the television screen of real element 302-1 with several 2D videos implementing virtual elements 304-1 through 304-9 positioned around the television, a championship logo implementing virtual element 304-10 positioned above the television, a 3D representation of the football field implementing virtual element 304-11 on the coffee table, and various volumetric models of football players implementing virtual elements 304-12 on the football field representation.

It will be understood that the virtual elements 304 illustrated in sporting event experience 300 are non-limiting examples of the types of XR content that may be selected and presented in connection with this type of primary content, and that these and other types of XR content may implement secondary content that complements the primary content for a particular example. Details regarding virtual elements 304 in this example implementation will now be described, but it will be understood that virtual elements 304 may be implemented in various other ways in other examples and that other virtual elements not explicitly described herein may also be provided.

In this example implementation, the 2D videos of virtual elements 304-1 through 304-3 may show marketing graphics, commentator video, and/or other content related to the sporting event. A user may select one of these virtual elements to view the 2D video on the television screen instead of the primary content (e.g., such that the 2D video of the virtual element 304 and the primary content displayed on real element 302-1 may switch places). Additionally or alternatively, a user may select one of these virtual elements to receive a special offer, to purchase an advertised product or service, to "upvote" or "like" related content, and/or to otherwise engage with the secondary content presented in these virtual elements. The 2D videos of virtual elements 304-4 through 304-6 may show family and friends of the user (e.g., selected automatically from the user's contacts or previously selected by the user) who are also watching the televised sporting event at the same time as the user but in a different location. Selecting a particular one of the virtual elements 304-4 through 304-6 may prioritize the family or friend's volume level or television broadcast audio or allow the user to communicate with the friend or family member by way of speech or text to allow the user to discuss the game as it proceeds. The 2D videos of virtual elements 304-7 through 304-9 may show alternative camera views of the football field and players that the user may look at to get more perspective on what is happening on different parts of the football field. If the user selects one of these virtual elements, the selected camera view may switch to the television of real element 302-1, swapping places with the primary content to allow the user more control over what he or she wants to see on the large screen and what content can be supplementarily displayed adjacent to the screen.

In this example implementation, a 3D logo is shown to implement virtual element 304-10. It will be understood that set dressing such as this logo may be implemented in 2D or 3D in various examples, may be static or dynamic (e.g., slightly moving such as by pulsating or having a liquid appear to flow over the surface in order to draw attention or look more attractive), and may include not only a logo or title, but various other thematic elements to help set the scene (e.g., making the remote control look like a football, making the floor look like football turf, making the walls look like stands full of cheering fans, etc.).

The 3D representation of virtual elements 304-11 may show a representation of the game as it is occurring, may display automatic instant replays, or may otherwise provide a 3D representation of what is shown in 2D in the primary content. The 3D representation may be interactive such as by allowing the user to zoom in and/or zoom out, rotate and/or translate the view, pause or rewind the scene being presented, and so forth. Additionally, while small players and objects are illustrated for virtual elements 304-12 in FIG. 3, it will be understood that larger representations may be employed in certain examples. For instance, a life-sized animated volumetric model of the quarterback may be presented as if standing next to the television as the quarterback scans the field, dodges defenders, and throws a pass. This model may be volumetrically captured in real time so as to be presented live and/or for instant replays in which the user may wish to see and analyze the quarterback's performance more closely.

As will be described in more detail below, all these examples of XR content presented to the user may be customized based on the user's preferences, based on the XR presentation device used to engage in the XR experience, based on the layout of the room and other aspects of the real-world environment, and so forth. While only visual XR elements are illustrated in FIG. 3, it will be understood that spatial audio (e.g., 3D sound) may also be simulated to add to the immersiveness of the XR experience. For example, XR content closest to the user may be made to sound closer than other XR content, audio virtually originating from certain locations in the room may be simulated to originate from those locations in the spatial audio field, and so forth. Additionally, all of the XR content available may be made to be enabled or disabled by default and an icon presented on the television screen (e.g., "NFL 5G" icon or the like) may indicate the availability of XR content when it is not currently enabled.

Like sporting event experience 300, television show experience 400 in FIG. 4 is shown to include a plurality of real elements 402 (e.g., real elements 402-1 through 402-4) integrated with a plurality of virtual elements 404 (e.g., virtual elements 404-1 through 404-6) that will be understood to be visible to a user viewing the world by way of an XR presentation device. For instance, virtual elements 404 may be XR content that is presented in connection with the presentation of the primary content (e.g., the children's television show) and that implements the selected subset of secondary content items that an implementation of system 100 may provide in accordance with method 200. Additionally, unlike FIG. 3, FIG. 4 further illustrates two different users 406 experiencing television show experience 400 using different types of XR presentation devices 408. Specifically, a user 406-1 is shown to be sitting on the ground and engaging in the XR experience using a head-mounted XR presentation device 408-1, while a user 406-2 is shown to be standing to the side of the television to engage in the XR experience using a handheld XR presentation device 408-2 (e.g., a mobile device such as a smartphone).

As shown, a real-world television implements real element 402-1, a piece of real-world furniture implements real element 402-2, a real-world wall directly behind the television implements real element 402-3, and a hallway off to the side implements real element 402-4. Similar to FIG. 3 described above, it will be understood that primary content (e.g., the "Blues Clues" children's television show in this example, or other suitable content) may be presented on the television screen such that both users 406 (as well as anyone else in the room who may or may not be a user of an XR presentation device) may be able to watch the primary content on the television.

As further shown in FIG. 4, television show experience 400 augments the presentation of the primary content on the television screen of real element 402-1 with characters from the show implementing virtual elements 404-1 and 404-2, a dancing alarm clock implementing virtual element 404-3, a logo for the show implementing virtual element 404-4, and framed pictures complying with the style of the show implementing virtual elements 404-5 and 404-6.

It will be understood that the virtual elements 404 illustrated in television show experience 400 are non-limiting examples of the types of XR content that may be selected and presented in connection with this type of primary content, and that these and other types of XR content may implement secondary content that complements the primary content in any suitable way for a particular example. Details regarding virtual elements 404 in this example implementation will now be described, but it will be understood that virtual elements 404 may be implemented in various other ways in other examples and that other virtual elements not explicitly described herein may also be provided.

In this example implementation, certain virtual elements 404 may be displaced from the scene displayed on the television screen to make the XR experience more interactive. For example, the man implementing virtual element 404-1 may be volumetrically captured such that a volumetric model may be made to emerge from the television screen or to come into the room in another way (e.g., appear to walk in from the hallway implementing real element 402-4). Similarly, an animated 3D model for the animated dog implementing virtual element 404-2 may be presented as XR content that similarly emerges from the screen or enters from the hallway. On-set decorations such as the framed pictures implementing virtual elements 404-5 and 404-6 may similarly be removed from the set shown on the television and instead be placed directly on the real-world wall of the room (real element 402-3), as shown. In contrast, other virtual elements such as the alarm clock implementing virtual element 404-3 and the logo implementing virtual element 404-4 may not take the place of anything that would otherwise be shown in the primary content on the television screen, but rather may be added to further augment the XR experience in similar ways as described above for the logo and 3D representation in sporting event experience 300.

As mentioned in relation to FIG. 3, all the examples of XR content presented to users 406 may be customized based on the individual users' preferences, based on the different XR presentation devices 408 used to engage in the XR experience, based on the layout of the room and other aspects of the real-world environment, and so forth. More particularly, certain virtual elements 404 may be presented in different ways (as well as from different vantage points) based on the different capabilities and characteristics of the specific XR presentation devices 408 being used by users 406. Additionally, the geometry of the real-world environment and where real elements 402 are located may influence how and where various virtual elements 404 are placed. For example, the alarm clock may be selected as a secondary content item based on the fact that there is space on the furniture (real element 402-2) for the alarm clock to dance, the framed pictures may be taken out of the primary content based on the presence of the wall (real element 402-3) and its suitability for hanging the pictures, the human and dog characters may enter from another room rather than coming out of the television based on the presence of the hallway (real element 402-4), and so forth.

FIGS. 3 and 4 have illustrated two specific types of XR experiences that may be provided by an implementation of system 100 using principles described herein. However, it will be recognized that a wide variety of XR experiences associated with various types of primary content may similarly be provided using the same principles. As one additional example, a televised broadcast of an awards show (e.g., the Oscars, etc.) may be augmented in customized ways by an implementation of system 100. For instance, a live stream of a volumetrically captured 3D model of a presenter and/or an award recipient may be provided and displayed as a life-sized person next to a television, 2D and/or 3D graphics related to the program may be displayed adjacent to the screen, and so forth.

In other additional examples, the primary content may be prerecorded (e.g., a movie that is watched on demand rather than streamed by a content provider) or may involve a live performance such that no television is involved in the presentation of the primary content. For instance, a live play that includes a jungle scene may be augmented by virtual jungle animals walking down the aisle to get onto the stage, a 3D representation of lyrics of songs being performed at a live concert may be floating above the stage, various helpful props or demonstrative elements may be presented next to a live presenter giving a talk at a conference or next to an instructor of a live educational course, and so forth. Indeed, principles described herein may find application not only with various types of televised broadcasts (e.g., children's programming and sporting events such as illustrated above, fictional television shows and movies, documentaries, commercials, educational programs, etc.) and live performances, but also with film production soundstages (e.g., 360-degree virtual sets), theatrical productions for stage, cinematic film presentations, music concerts, business conference keynote speeches, company presentations, and various other types of primary content. As such, the impact of the methods and systems described herein may impact industries as varied as entertainment, education/training, marketing, retail, health and fitness, travel, real estate, tours, venues, advanced communication, gaming, and various others.

Moreover, other possible applications of methods and systems described herein for customizing augmentation of a presentation of primary content may include applications in human capital management, human resource learning and development, and other related fields. For example, XR content related to skills evaluation may be used in recruiting new hires based on their incoming skill sets, AR-based ranking systems may communicate with human resource systems, XR content may enable inputs to a skills passport as employees journey through a company (e.g., to present information on past positions and provide guidance on potential future positions), levels of difficulty in an educational course may reflect employee experience and skill, and so forth.

As mentioned above, the operations of method 200 described above may be performed by system 100 in different ways for different implementations of system 100 implemented on different sides of a server-client architecture. For example, for a server-side implementation, system 100 may be implemented by an XR system communicatively coupled to an XR presentation device by way of a network and the identifying of the presentation context dataset (operation 202) may be performed by receiving the presentation context dataset from the XR presentation device by way of the network. In the server-side implementation, the selecting of the subset of secondary content items (operation 204) may be performed prior to sending secondary content items over the network to the XR presentation device such that the providing of the selected subset of secondary content items (operation 206) includes 1) generating a custom XR stream that includes the selected subset of secondary content items, and 2) transmitting the custom XR stream to the XR presentation device by way of the network.

In contrast, for a client-side implementation, system 100 may be implemented by an XR presentation device communicatively coupled to an XR system by way of a network and the identifying of the presentation context dataset (operation 202) may be performed by determining (e.g., directly detecting, accessing stored data, etc.) the presentation context dataset. In this implementation, the XR presentation device may receive (e.g., by way of the network from the XR system) a non-custom XR stream including the set (i.e., the full set, rather than a custom subset) of secondary content items. As such, in this client-side implementation, the selecting of the subset of secondary content items (operation 204) may include extracting the selected subset of secondary content items from the non-custom XR stream received from the XR server system. The providing of the selected subset of secondary content items (operation 206) may then be performed by providing the selected subset of secondary content items to a display device configured to present the selected subset of secondary content items.

Figure 5:
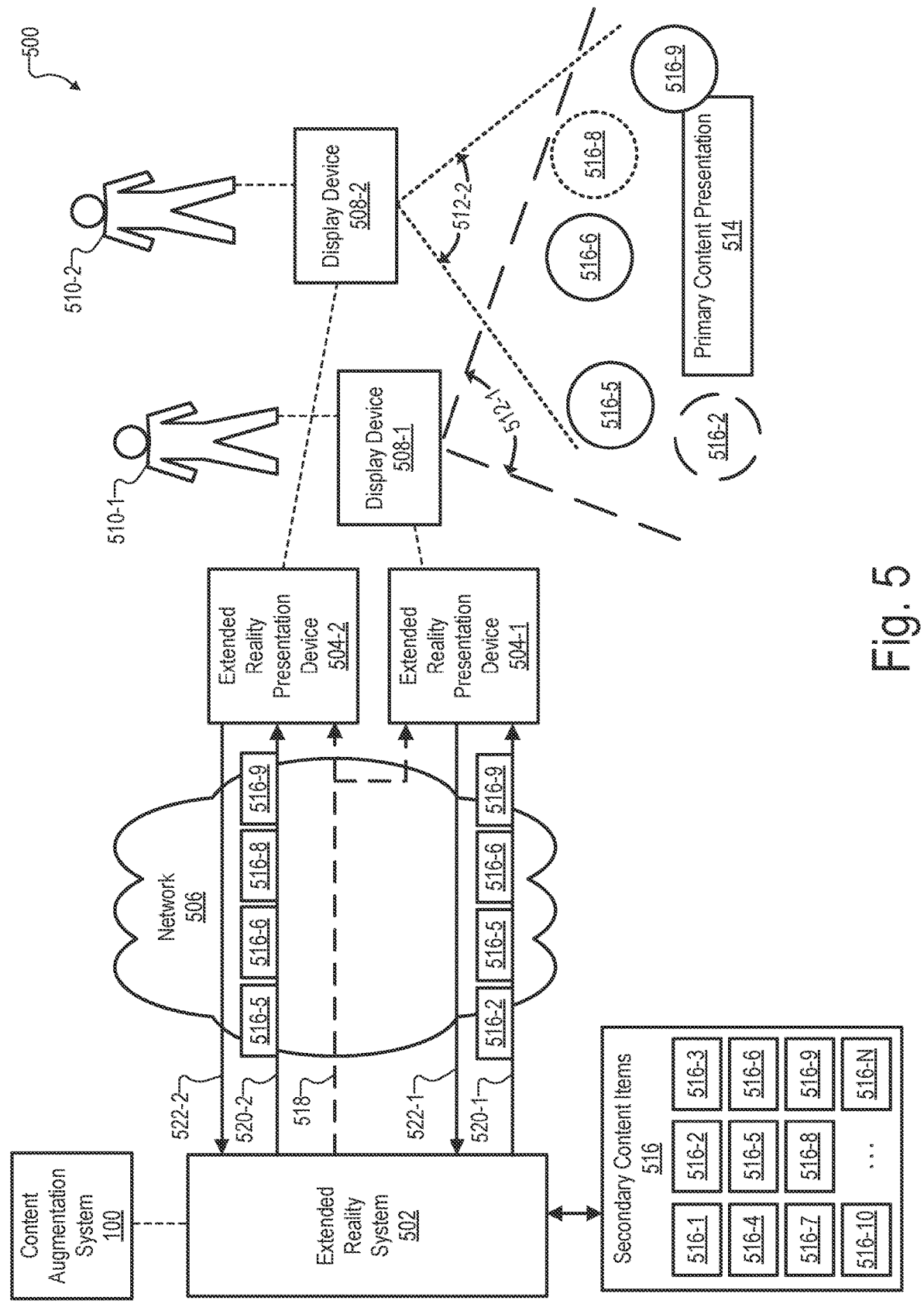
FIG. 5 shows an illustrative configuration in which the content augmentation system of FIG. 1 is implemented by an illustrative XR system in accordance with principles described herein.

To illustrate these two types of implementations of system 100 and method 200 (i.e., the server-side implementation and the client-side implementation), FIGS. 5-8 will now be described. FIG. 5 will illustrate a configuration utilizing a server-side implementation of system 100 and FIG. 6 will show a method that illustrates more particularly the operations that this implementation of system 100 may perform. Thereafter, FIG. 7 will illustrate a configuration utilizing a client-side implementation of system 100 and FIG. 8 will show a method that illustrates more particularly the operations that this implementation of system 100 may perform.

FIG. 5 shows an illustrative configuration 500 in which system 100 is implemented by an illustrative XR system that is implemented on the server side of a server-client architecture and may also be referred to as an XR server system. Specifically, as illustrated by a thin broken line connecting system 100 to an XR system 502, system 100 will be understood to be implemented by XR system 502 in this configuration. As shown, XR system 502 may be communicatively coupled to a plurality of XR presentation devices 504 (XR presentation devices 504-1 and 504-2 are explicitly shown in configuration 500, though it will be understood that more or fewer XR presentation devices may be served by XR system 502 in certain configurations) by way of a network 506. Each of XR presentation devices 504 is shown to be associated with (e.g., to include or be communicatively coupled to) respective display devices 508 (display device 508-1 for XR presentation device 504-1 and display device 508-2 for XR presentation device 504-2) that present customized XR content to respective users 510 (user 510-1 using XR presentation device 504-1 and display device 508-1 and user 510-2 using XR presentation device 504-2 and display device 508-2).

As shown, XR system 502 is a server-side system communicatively coupled to XR presentation devices 504 by way of network 506 while XR presentation devices 504 present respective XR experiences to users 510 by way of respective display devices 508. To this end, XR system 502 may be implemented as any computing system or group of computing systems (e.g., cloud-based multi-access servers, MEC servers, a combination of these, etc.) that provides graphical and/or audio content (e.g., primary content, secondary content items or other XR content, etc.), as well as metadata and/or other information, to XR presentation devices 504. In this way, XR system 502 and its implementation of system 100 may facilitate and enable presentation of XR experiences such as experiences 300 and 400 to users 510.

Figure 6:
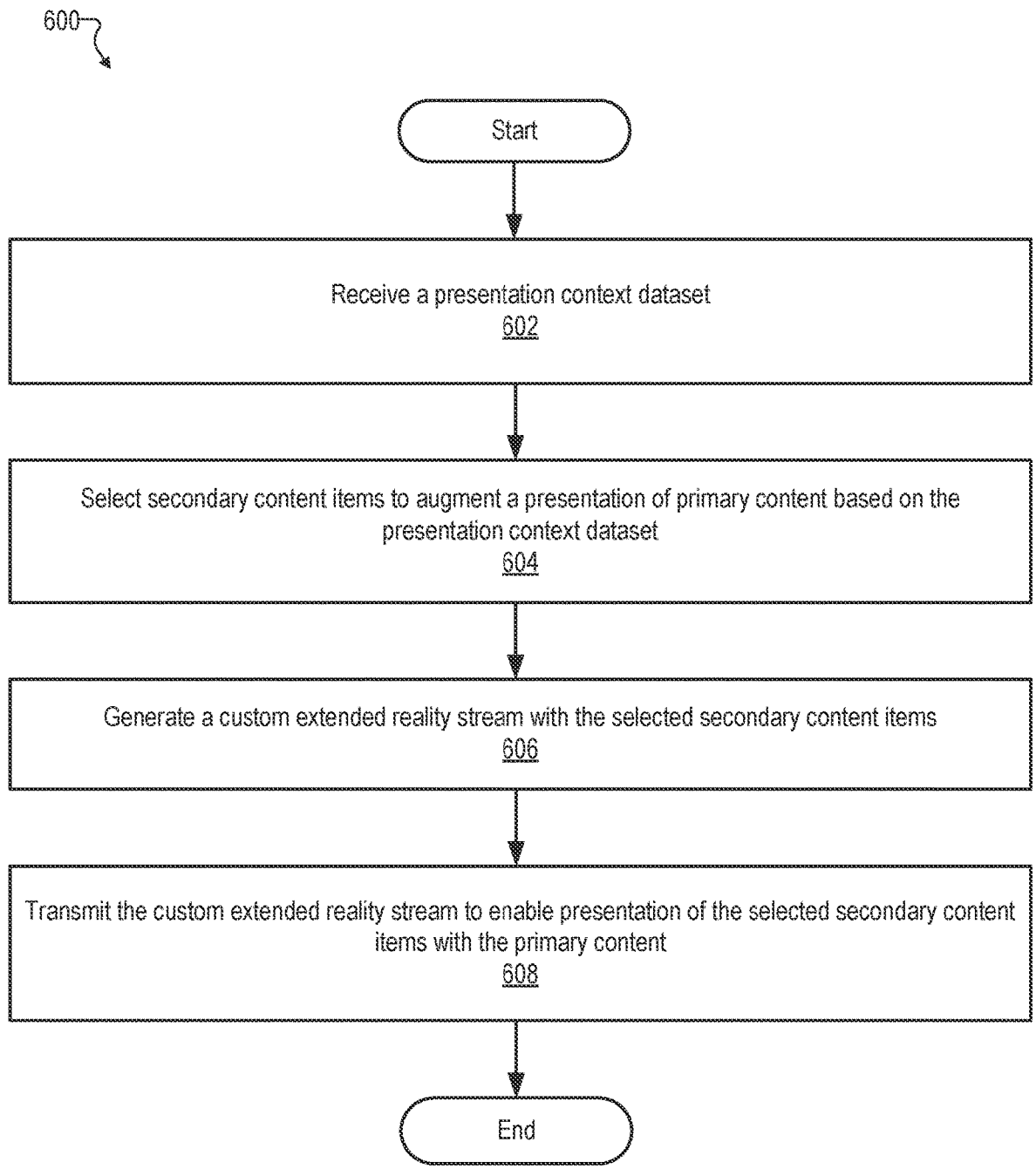
FIG. 6 shows an illustrative method performed by the implementation of the content augmentation system in the configuration of FIG. 5.

As mentioned above, the implementation of system 100 included in XR system 502 may perform operations similar or equivalent to those described in method 200 in a manner specific to this server-side implementation. To illustrate, FIG. 6 shows an illustrative method 600 performed by the server-side implementation of system 100 shown to be integrated with XR system 502 in FIG. 5. Similar to FIG. 2, it will be understood that while FIG. 6 shows illustrative operations according to one implementation, other implementations may omit, add to, reorder, and/or modify any of the operations shown in FIG. 6. In some examples, multiple operations shown in FIG. 6 or described in relation to FIG. 6 may be performed concurrently (e.g., in parallel) with one another, rather than being performed sequentially as illustrated and/or described. One or more of the operations shown in FIG. 6 may be performed by a content augmentation system implementation such as the instance of system 100 shown to be implemented by XR system 502 in FIG. 5. For example, such content augmentation systems may include components such as 1) a network interface configured to communicate, by way of a network (e.g., network 506), with one or more XR presentation devices (e.g., XR presentation devices 504); 2) a memory storing instructions; and 3) a processor communicatively coupled to the memory and the network interface and configured to execute the instructions to perform (e.g., in real time as described above for the operations of method 200) any or all of operations 602-608 described below.

At operation 602, system 100 may receive a presentation context dataset. Specifically, as will be described in more detail below, system 100 may receive the presentation context dataset from an XR presentation device (e.g., one of XR presentation devices 504) by way of the network (e.g., network 506) and the network interface. As described above in relation to operation 202, the presentation context dataset received at operation 602 may indicate how the XR presentation device is to present XR content in connection with a presentation of primary content.

At operation 604, system 100 may select, based on the presentation context dataset received at operation 602, a subset of secondary content items from a set of secondary content items. For example, as will be described in more detail below, the set of secondary content items may be accessible to the XR server system implementing system 100 and each of the secondary content items may be configured for presentation as XR content that augments the presentation of the primary content.

At operation 606, system 100 may generate a custom XR stream that includes the selected subset of secondary content items. More particularly, the XR stream may be customized to the particular XR presentation device that provided the presentation context dataset. In certain examples, different custom XR streams may be generated for different XR presentation devices each based specifically on presentation context datasets that the respective XR presentation devices have provided.

At operation 608, system 100 may transmit the custom XR stream generated at operation 606 to the XR presentation device that provided the presentation context dataset at operation 602 by way of the network interface and the network. By transmitting the custom XR stream at operation 608, system 100 may enable presentation, by the XR presentation device, of the selected subset of secondary content items in connection with the presentation of the primary content.

Returning to FIG. 5, network 506 enables the implementation of system 100 performing method 600 on XR system 502 to communicate with XR presentation devices 504 (e.g., to communicate specific data mentioned above in relation to method 600 and described in more detail below). Network 506 may include any network or networks configured to transport data between endpoints such as XR system 502, one or more XR presentation devices 504, and/or other devices or systems as may be present in a particular implementation. In some examples, network 506 may include or be associated with a local area network, a wide area network, or the Internet. Additionally, network 506 may include a provider network such as a cellular data network (e.g., a 5G network or data network of another suitable generation) that is managed by a service provider such as a telecommunications service provider (e.g., a cellular service provider), an application service provider, a storage service provider, an internet service provider, or the like.

In certain examples, XR system 502 may be implemented as a cloud-based XR server system connected to network 506, while in other examples XR system 502 may be implemented as a MEC-based XR server system operating within network 506. For example, the MEC system may be implemented on the edge of the provider network within a network element such as a radio access network, a transport access point, a service access point, or another such element of the provider network. While a cloud-based XR server system may take advantage of certain economies of scale (along with associated efficiencies and other advantages associated therewith) that may not be available for MEC-based systems, MEC-based systems may be configured to provide more responsive computational support to XR presentation devices 504. For example, latencies of tasks performed by MEC-based implementations of XR system 502 may be significantly lower than latencies of tasks performed by cloud-based implementations. In certain examples XR system 502 may be implemented by a combination of cloud-based and MEC-based computing resources to allow for performance of different types of tasks (e.g., tasks prioritizing processing efficiencies, tasks prioritizing low-latency responsiveness, etc.) to be optimized according to the different strengths of these types of systems.

XR presentation devices 504 and their respective display devices 508 may be implemented as any suitable computing devices configured to present XR experiences in any way as may serve a particular implementation. For instance, as shown in FIG. 4, a handheld mobile device (e.g., a general-purpose mobile device such as a smartphone or tablet device) may serve as one example of an XR presentation device 504 and corresponding display device 508, while a head-mounted, special-purpose XR presentation device (e.g., a head-mounted XR presentation device, etc.) may serve as another example of an XR presentation device 504 and corresponding display device 508. In still other examples, other types of devices (e.g., laptop or desktop computers, etc.) may be employed as may serve a particular implementation. In certain examples, a display device 508 (e.g., a head-mounted display, a handheld screen, etc.) may be integrated with processing resources of XR presentation device 504 within a single enclosure, while, in other examples, processing and display operations may be performed by different devices or different components of a single device (e.g., a handheld component tethered to a head-mounted component, etc.).

As shown, the respective users 510 of XR presentation devices 504 may be co-located (e.g., located in the same room, etc.) so as to jointly experience, by way of their own respective fields of view 512 (field of view 512-1 provided to user 510-1 by display device 508-1 and field of view 512-2 provided to user 510-2 by display device 508-2), a primary content presentation 514 augmented by a variety of secondary content items 516. For instance, referring to television show experience 400 of FIG. 4, two users 406 and their respective XR presentation devices 408 (which are shown to integrate respective display devices that display the XR content) may correspond to the two users 510 and their respective XR presentation devices 504 (as well as the associated display devices 508).

Primary content presentation 514 represents the presentation of any type of primary content described herein. In particular, as shown in FIG. 5, primary content presentation 514 may be presented in a way that both users 510 can experience the same primary content, albeit with their own custom augmentations (as described in more detail below). As has been mentioned, certain examples may involve presenting primary content on a shared screen (e.g., a television such as shown in the examples of FIGS. 3 and 4), while other examples may involve presenting primary content as a live performance (e.g., on a stage, at a podium, etc.), on the display devices 508 themselves, or in other ways. For instance, primary content 518 may be implemented by 2D video content (e.g., a television show or movie, a live sporting event, etc.) that is provided, by XR system 502 to one or both XR presentation devices 504 by way of network 506, together with custom XR streams 520-1 and 520-2 (or with non-custom streams as will be described below in relation to FIG. 7) that include secondary content items 516 that are selected to be part of the respective subsets of secondary content items 516 for each XR presentation device 504. In such examples, the presentation of the primary content at primary content presentation 514 may include presenting (e.g., by XR presentation devices 504 and display device 508, by a separate device such as a shared television, etc.) the 2D video content in connection with the presentation of the selected subset of secondary content items 516.

FIG. 5 shows that the same primary content 518 may be provided to both XR presentation devices 504 for presentation as part of primary content presentation 514 (the same arrow originating at XR system 502 splits off to both XR presentation devices 504). Additionally, as indicated by the dashed style of primary content 518, it will be understood that the transmission of primary content 518 from XR system 502 may be optional and not performed for every implementation. For instance, certain implementations may involve primary content being transmitted directly to a smart television, router, set top box or other device separate from XR presentation devices 504. As another example, certain implementations may involve live performance primary content such that no primary content need be transmitted at all. For example, primary content presentation 514 may include a live performance performed, for live viewing by users 510 of XR presentation devices 504, at the location of the users and XR presentation devices (e.g., in a theater, auditorium, or other suitable live performance venue).

As indicated by the different line styles of fields of view 512-1 and 512-2 and the secondary content items 516 within the fields of view, users 510 may be presented different XR content based on various presentation context factors described in more detail below. Specifically, the secondary content items 516 drawn with solid lines (i.e., secondary content items 516-5, 516-6, and 516-9) may be presented (e.g., in the same form or perhaps in different forms such as different resolutions or formats) to both users 510-1 and 510-2. In contrast, a secondary content item 516-2 drawn with a dashed line matching the dashed lines used for field of view 512-1 may only be presented to user 510-1 by XR presentation device 504-1 (and not presented to user 510-2 by XR presentation device 504-2), while a secondary content item 516-8 drawn with a dotted line matching the dotted line used for field of view 512-2 may only be presented to user 510-2 by XR presentation device 504-2 (and not presented to user 510-1 by XR presentation device 504-1).

The selected subsets of secondary content items 516 presented by a given XR presentation device 504 in connection with primary content presentation 514 (i.e., secondary content items 516-2, 516-5, 516-6, and 516-9 presented by XR presentation device 504-1 and secondary content items 516-5, 516-6, 516-8, and 516-9 presented by XR presentation device 504-2 in this example) may include any XR content described herein or as may serve a particular implementation. As one example illustrated above in sporting event experience 300, the primary content may include 2D video content (e.g., the televised football game) and the selected subset of secondary content items may include secondary content items comprising additional 2D video content related to the primary content and configured to be selected to at least temporarily replace the 2D video content of the primary content (e.g., other camera views of the football game, commentary or other related content, etc.). As another example illustrated above in both sporting event experience 300 and television show experience 400, the selected subset of secondary content items may include a secondary content item comprising dynamic 3D XR content related to the primary content and configured to be presented concurrently with the presentation of the primary content (e.g., volumetrically captured 3D representations of football players on the field or characters from the television show, etc.). As yet another example illustrated by both experiences 300 and 400, the selected subset of secondary content items may include a secondary content item comprising static set dressing content related to the primary content and configured to be presented concurrently with the presentation of the primary content (e.g., logos, framed pictures, etc.).

In some examples, secondary content items 516 may not only add to elements shown in primary content presentation 514, but may replace these elements (e.g., causing objects or characters shown in the primary content to be removed from the primary content so as to appear to emerge from the primary content and exist elsewhere in the environment). For example, as illustrated by television show experience 400, the primary content may include 2D video content depicting a plurality of elements (e.g., a children's television show depicting elements such as the human host of the show and the dog character), and the selected subset of secondary content items may include a secondary content item comprising a representation of a particular element of the plurality of elements depicted in the 2D video content of the primary content (e.g., secondary content items representative of the human host and the dog character). In this type of example, the providing of the selected subset of secondary content items for presentation by the XR presentation device may therefore include removing the particular element from the 2D video content included in the primary content (e.g., extracting the human and dog from the content displayed on the television) and providing the secondary content item comprising the representation of the particular element for presentation as XR content that augments the presentation of the 2D video content included in the primary content (e.g., presenting the volumetric models of the human and dog next to the television in the users' environment). As XR content exits a television screen or live performance to enter the user's environment, appropriate graphical special effects for the transitions may be employed to align the XR content with appropriate enter and exit points on-screen and within the structures of the real-world environment (e.g., the hallway, etc.).

Secondary content items 516 are represented as circles in FIG. 5 when shown within fields of view 512. In this way, it will be understood that these secondary content items represent any of the types of XR content described herein. Elsewhere in FIG. 5, however, secondary content items 516 are shown to be represented as squares to represent the data being stored, accessed, processed, and transmitted in order for the presentation of this XR content to be performed. It will be understood that the XR content data for a particular secondary content item and the presentation of that XR content are both labeled with the same number in FIG. 5, such that, for example, the box labeled 516-2 represents the XR content data for the augmentation represented by the circle labeled 516-2.

The particular secondary content items 516 presented by a given XR presentation device 504 in connection with primary content presentation 514 (i.e., secondary content items 516-2, 516-5, 516-6, and 516-9 presented by XR presentation device 504-1 and secondary content items 516-5, 516-6, 516-8, and 516-9 presented by XR presentation device 504-2 in this example) may be selected based on any selection criteria as may serve a particular implementation. For example, the selecting of secondary content items for a particular XR presentation device 504 may be performed based on a presentation context dataset 522 received from that XR presentation device 504 (e.g., presentation context dataset 522-1 received from XR presentation device 504-1, presentation context dataset 522-2 received from XR presentation device 504-2). Based on the appropriate presentation context data, secondary content items 516 may be accessed from a full set of secondary content items 516 available to XR system 502 (i.e., the set of secondary content items 516 labeled secondary content items 516-1 through 516-N), and then compiled into individual custom XR streams 520 that include the selected subsets of secondary content items 516 (and that are optionally simulcast with primary content 518, as described above). Specifically, as shown, system 100 may generate and transmit custom XR stream 520-1 with secondary content items 516-2, 516-5, 516-6, and 516-9 based on presentation context dataset 522-1. System 100 may also generate and transmit custom XR stream 520-2 with secondary content items 516-5, 516-6, 516-8, and 516-9 based on presentation context dataset 522-2.

The presentation context data included in presentation context datasets 522 may indicate any of various capabilities, conditions, circumstances, preferences, or other information related to users 510, XR presentation devices 504, the environment in which the users and devices are located during the primary content presentation, or the like. To illustrate, a few examples of presentation context data will now be described.

One type of data that a presentation context dataset 522 may include is device data indicative of one or more attributes of the XR presentation device. For example, device data may indicate a model number of the device, a software or firmware version of the device, a device type of the device (e.g., a head-mounted device with a dual-screen stereoscopic display, a handheld mobile device, a stationary computer device, etc.), or other such information. As another example, device data may indicate device capabilities of the device such as a maximum resolution the device can display, the number of speakers that the device can use to present audio (e.g., a stereo headset, a 5.1 surround sound setup, etc.), a processing speed or other capability of processing resources of the device (e.g., graphics processing resources, audio processing resources, etc.), and so forth.

Another type of data that a presentation context dataset 522 may include is environmental data indicative of one or more attributes of an environment in which the presentation of the primary content occurs. For example, the XR presentation device may detect environmental data using Simultaneous Localization and Mapping (SLAM) techniques and/or access environmental data that has been previously stored. Environmental data may allow secondary content items to interact appropriately with the actual environment in which the presentation of the primary content is happening in terms of lighting and shadows, occlusion with real objects in the environment, and so forth. For instance, referring to the examples of FIGS. 3 and 4, environmental data may be used to allow the 3D representation of the football game to be situated properly on the coffee table, to cause logos and set dressing augmentations to be centered above televisions or hung like pictures on blank areas of the wall, to determine where the human and dog in FIG. 4 can enter/exit (e.g., to appear to enter or leave via the hallway, etc.) and locate themselves within the room (e.g., so as to stand behind a piece of furniture or a real person, etc.), to allow the dog and human characters to cast shadows and be illuminated as if they really existed in the real-world environment, and so forth.

Yet another type of data that a presentation context dataset 522 may include is user preference data indicative of one or more preferences of a user associated with the XR presentation device. For example, the user preference data may indicate personal information about the user (e.g., age, language, demographics, education, etc.); parental permission for the type of content that is suitable for a child user (e.g., no strobe effects, no adult language or situations, time limits for device use, etc.); personal preferences for the types of XR content that the user wants to see (e.g., provide only non-interactive XR content, provide XR content only for animated comedies but not news and other programs, provide only the 3D representation of the football game in FIG. 3 but not the 2D video options around the television, etc.); preferences about what sound system is to be used to present audio; and/or any other preferences and selections as may serve a particular implementation. In some examples, user preference data may indicate not only explicitly selected preferences of the user but also (or alternatively) proficiencies that have been detected for the user. For instance, an educational primary content presentation may be custom augmented by different types of secondary content items that are selected based on educational proficiencies of the user (e.g., providing XR content with more advanced information for advanced students than for less advanced students so as to help keep all learners engaged).

Figure 7:
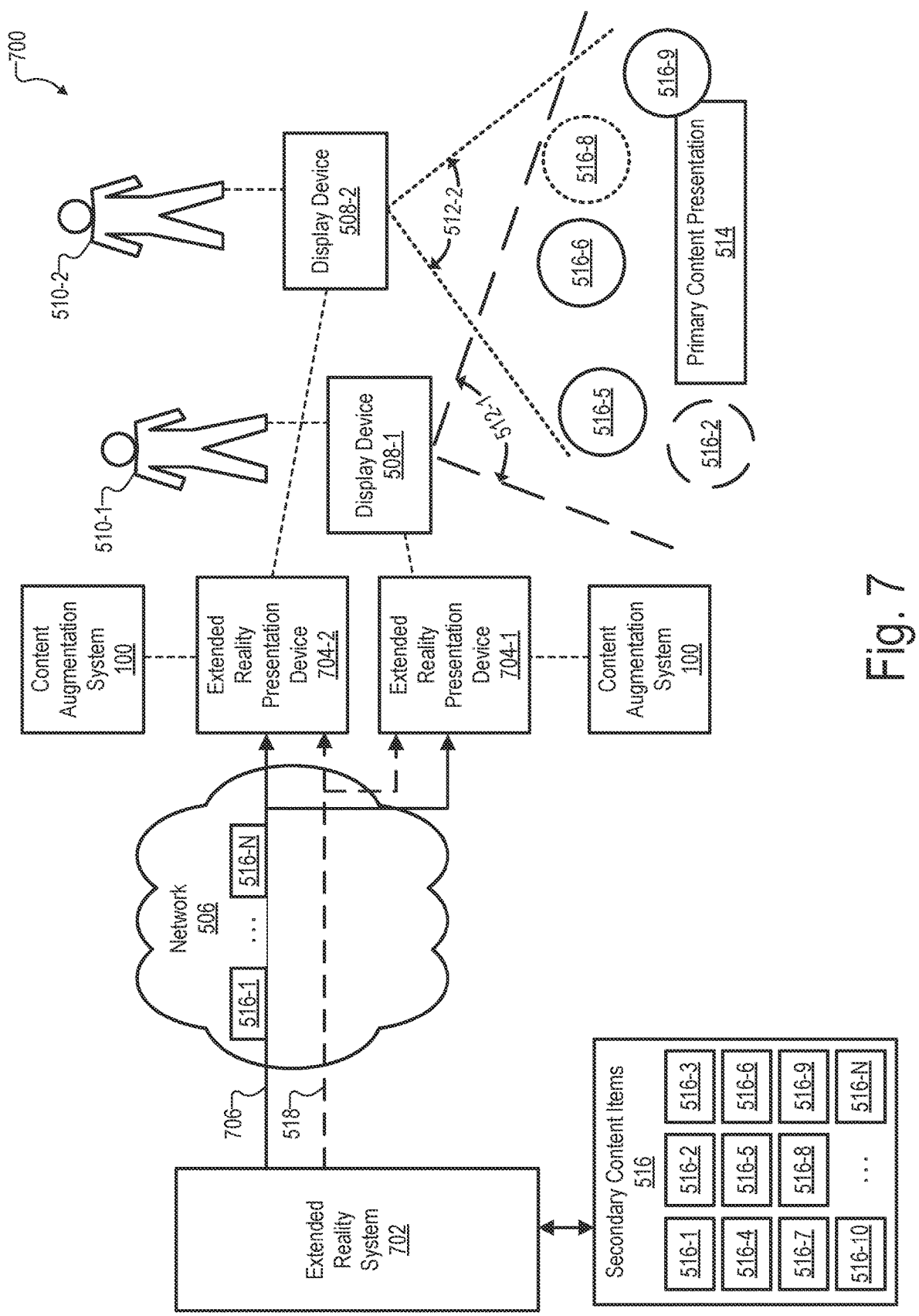
FIG. 7 shows an illustrative configuration in which the content augmentation system of FIG. 1 is implemented by illustrative XR presentation devices in accordance with principles described herein.
Figure 8:
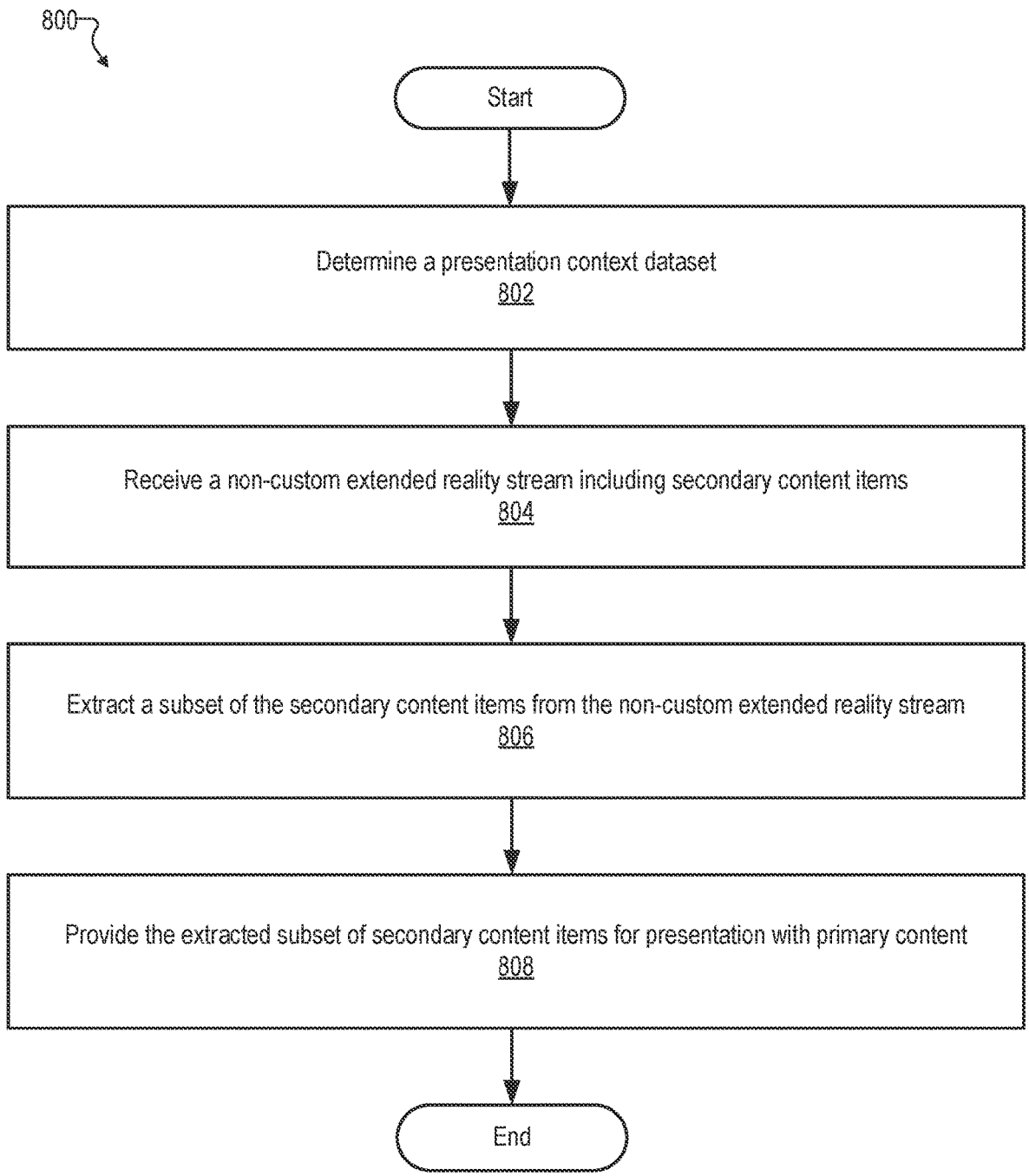
FIG. 8 shows an illustrative method performed by the implementation of the content augmentation system in the configuration of FIG. 7.

As mentioned above, while FIGS. 5 and 6 relate to a server-side implementation of system 100, FIG. 7 illustrates a configuration utilizing a client-side implementation of system 100 and FIG. 8 shows a method that illustrates more particularly the operations that may be performed by this type of implementation.

More specifically, FIG. 7 shows an illustrative configuration 700 that includes the same or similar elements as configuration 500, but in which system 100 is implemented not by the XR server system, but by each of the XR presentation devices. As shown, XR system 502 of FIG. 5 is replaced in FIG. 7 by an XR system 702 to reflect that the server no longer hosts a configuration of system 100. Similarly, as illustrated by thin broken lines connecting to instances of system 100, the XR presentation devices 504 of FIG. 5 are replaced in FIG. 7 by respective XR presentation devices 704 (XR presentation devices 704-1 and 704-2) to reflect that these devices now each host individual client-side implementations of system 100. Other than the functions of system 100 being moved from one computing system to the other, the XR server systems and XR presentation devices in configurations 500 and 700 may be understood to perform similar functions in similar ways as have been described. Moreover, various other components and data described above in relation to FIG. 5 are also shown in configuration 700 and will be understood to perform the same or similar functions as have been described. For example, FIG. 7 shows network 506, respective display devices 508 associated with the XR presentation devices, fields of view 512, primary context presentation 514, secondary content items 516, and an optional transmission of primary content 518 being delivered to XR presentation devices 704. Additionally, a non-custom XR stream 706 is shown in FIG. 7 to be transmitted to both XR presentation devices 704 in place of the different custom XR streams 520 of FIG. 5. Non-custom XR stream 706 will be described in more detail below.

As with the server-side implementation of system 100 described above, the client-side implementations of system 100 included in XR presentation device 704 may perform operations similar or equivalent to those described in method 200 in a manner specific to this client-side implementation. To illustrate, FIG. 8 shows an illustrative method 800 performed by the client-side implementations of system 100 shown to be integrated with XR presentation devices 704 in FIG. 7. Similar to FIGS. 2 and 6, it will be understood that while FIG. 8 shows illustrative operations according to one implementation, other implementations may omit, add to, reorder, and/or modify any of the operations shown in FIG. 8. In some examples, multiple operations shown in FIG. 8 or described in relation to FIG. 8 may be performed concurrently (e.g., in parallel) with one another, rather than being performed sequentially as illustrated and/or described. One or more of the operations shown in FIG. 8 may be performed by content augmentation system implementations such as the instances of system 100 shown to be implemented by XR presentation devices 704 in FIG. 7. For example, such content augmentation systems may include components such as 1) a network interface configured to communicate, by way of a network (e.g., network 506), with an XR system (e.g., XR system 702); 2) a memory storing instructions; and 3) a processor communicatively coupled to the memory and the network interface and configured to execute the instructions to perform (e.g., in real time as described above for the operations of methods 200 and 600) any or all of operations 802-808 described below.

At operation 802, system 100 may determine a presentation context dataset indicating how the system is to present XR content in connection with a presentation of primary content. Specifically, as has been described, system 100 may detect various types of information, access various types of stored information, and/or otherwise accumulate or determine information represented in the presentation context dataset.

At operation 804, system 100 may receive (e.g., from the XR system and by way of the network interface), a non-custom XR stream. That is, rather than receiving different and individually customized XR streams 520 described above in relation to FIG. 5, the XR presentation devices (and hence the instances of system 100 implemented by these devices) may in this example receive a same non-custom XR stream 706 that includes not just a subset of secondary content items 516 but the full set of secondary content items 516-1 through 516-N (which again are each configured for presentation as XR content to augment the presentation of the primary content).

At operation 806, system 100 may extract a subset of secondary content items from the set of secondary content items included in the non-custom XR stream. For example, based on the presentation context dataset determined at operation 802 and the full set of secondary content items 516 received in non-custom XR stream 706 at operation 804, system 100 may select the subset of secondary content items (similar to operation 204 or in other suitable ways described herein) and extract the selected secondary content items from non-custom XR stream 706 as appropriate for a given presentation context dataset.

At operation 808, system 100 may provide the subset of secondary content items extracted at operation 806 to a display device (e.g., the associated display device 508), which, as described above, may be configured to present the extracted subset of secondary content items in connection with the presentation of the primary content. Accordingly, as shown in FIG. 7, each display device 508 may present, based on its respective field of view 512, the same secondary content items 516 described above in relation to FIG. 5 (and as indicated again by the different line styles) in connection with primary content presentation 514.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
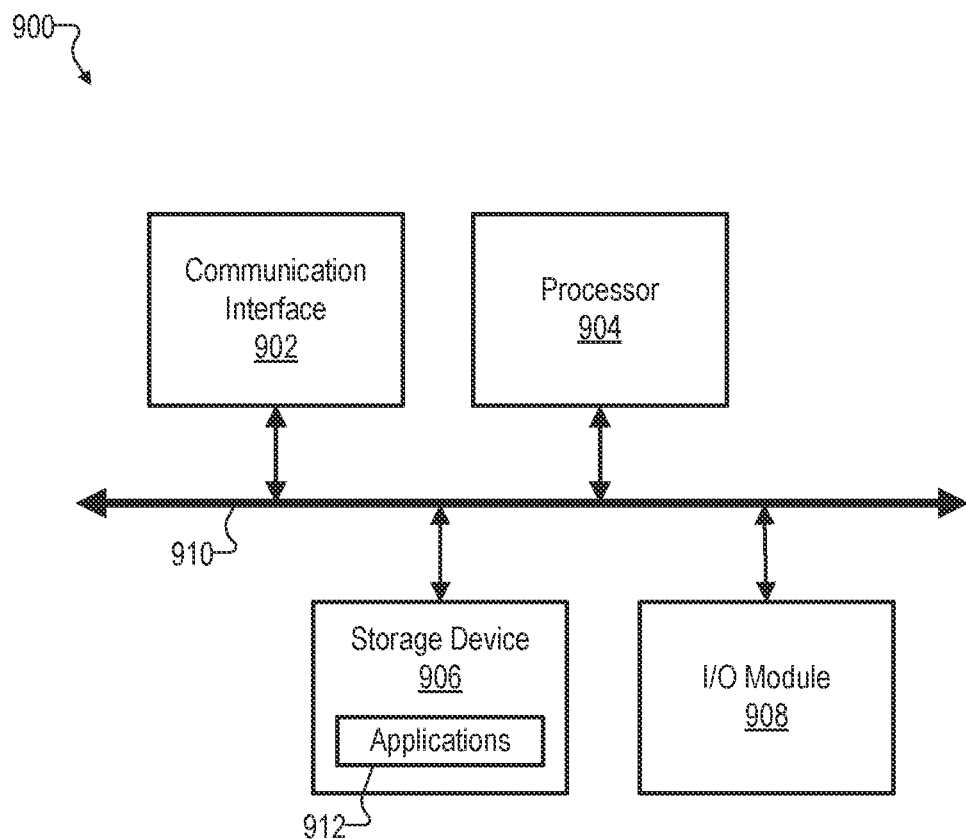
FIG. 9 shows an illustrative computing device that may implement content augmentation systems and/or other systems and devices described herein in accordance with principles described herein.

FIG. 9 shows an illustrative computing device 900 that may implement content augmentation systems and/or other systems and devices described herein in accordance with principles described herein. For example, computing device 900 may include or implement (or partially implement) a content augmentation system such as system 100 or any component included therein or any system associated therewith. For instance, computing device 900 may implement any of XR systems 502 or 702, XR presentation devices 504 or 704, elements of network 506 or display devices 508, other devices related to configurations 500 or 700 (e.g., televisions or other primary content presentation devices not explicitly shown, etc.), and/or other devices or systems described herein.

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
identifying, by a content augmentation system, a presentation context dataset indicating how an extended reality (XR) presentation device is to present XR content in connection with a presentation of primary content;
selecting, by the content augmentation system based on the presentation context dataset, a subset of secondary content items from a set of secondary content items each configured for presentation as XR content that augments the presentation of the primary content, wherein the selected subset of secondary content items includes a set dressing element that includes a logo or title for the primary content to help set a scene in which the primary content is presented; and
providing, by the content augmentation system, the selected subset of secondary content items for presentation by the XR presentation device in connection with the presentation of the primary content, wherein the presentation of the primary content occurs on a screen or stage concurrently with a presentation of the set dressing element that occurs outside the screen or stage.

2. The method of claim 1, wherein:
the content augmentation system is implemented by an XR system communicatively coupled to the XR presentation device by way of a network;
the identifying of the presentation context dataset includes receiving the presentation context dataset from the XR presentation device by way of the network; and
the providing of the selected subset of secondary content items includes:
generating a custom XR stream that includes the selected subset of secondary content items, and
transmitting the custom XR stream to the XR presentation device by way of the network.

3. The method of claim 1, wherein:
the content augmentation system is implemented by the XR presentation device;
the XR presentation device receives, by way of a network from an XR system, a non-custom XR stream including the set of secondary content items;
the selecting of the subset of secondary content items includes extracting the selected subset of secondary content items from the non-custom XR stream received from the XR system; and
the providing of the selected subset of secondary content items is performed by providing the selected subset of secondary content items to a display device configured to present the selected subset of secondary content items.

4. The method of claim 1, wherein:
the XR presentation device is communicatively coupled to an XR system by way of a network;
the primary content is 2D video content that is provided, by the XR system to the XR presentation device by way of the network, together with a custom or non-custom XR stream that includes secondary content items that are selected to be part of the subset of secondary content items;
the presentation of the primary content includes presenting the 2D video content on the screen; and
the screen is implemented as a television screen.

5. The method of claim 1, wherein the primary content is a live performance performed on the stage for viewing by a user of the XR presentation device at a location of the user and the XR presentation device.

6. The method of claim 1, further comprising:
identifying, by the content augmentation system, an additional presentation context dataset indicating how an additional XR presentation device is to present XR content in connection with the presentation of the primary content, the additional XR presentation device co-located with the XR presentation device such that users of both the XR presentation device and the additional XR presentation device concurrently view the presentation of the primary content;
selecting, by the content augmentation system based on the additional presentation context dataset, an additional subset of secondary content items from the set of secondary content items, the additional subset of secondary content items different from the subset of secondary content items in accordance with a difference between the presentation context dataset and the additional presentation context dataset; and
providing, by the content augmentation system, the additional selected subset of secondary content items for presentation by the additional XR presentation device in connection with the presentation of the primary content.

7. The method of claim 1, wherein the presentation context dataset includes device data indicative of one or more attributes of the XR presentation device.

8. The method of claim 1, wherein the presentation context dataset includes environmental data indicative of one or more attributes of an environment in which the presentation of the primary content occurs.

9. The method of claim 1, wherein the presentation context dataset includes user preference data indicative of one or more preferences of a user associated with the XR presentation device.

10. The method of claim 1, wherein:
the primary content includes 2D video content; and
the selected subset of secondary content items includes a secondary content item comprising additional 2D video content related to the 2D video content of the primary content and configured to be selected to at least temporarily replace the 2D video content of the primary content.

11. The method of claim 1, wherein the selected subset of secondary content items includes a secondary content item comprising dynamic 3D XR content related to the primary content and configured to be presented concurrently with the presentation of the primary content.

12. The method of claim 1, wherein the set dressing element comprises static set dressing content.

13. The method of claim 1, wherein:
the primary content includes 2D video content depicting a plurality of elements;
the selected subset of secondary content items includes a secondary content item comprising a representation of a particular element of the plurality of elements depicted in the 2D video content of the primary content; and
the providing of the selected subset of secondary content items for presentation by the XR presentation device includes:
removing the particular element from the 2D video content included in the primary content, and
providing the secondary content item comprising the representation of the particular element for presentation as XR content that augments the presentation of the 2D video content included in the primary content.

14. The method of claim 1, embodied as computer-executable instructions on at least one non-transitory computer-readable medium.

15. A system comprising:
a network interface configured to communicate, by way of a network, with an extended reality (XR) presentation device;
a memory storing instructions; and
a processor communicatively coupled to the memory and the network interface and configured to execute the instructions to:
receive, from the XR presentation device and by way of the network interface, a presentation context dataset indicating how the XR presentation device is to present XR content in connection with a presentation of primary content;
select, based on the presentation context dataset, a subset of secondary content items from a set of secondary content items each configured for presentation as XR content that augments the presentation of the primary content, wherein the selected subset of secondary content items includes a set dressing element that includes a logo or title for the primary content to help set a scene in which the primary content is presented;
generate a custom XR stream that includes the selected subset of secondary content items; and
transmit, to the XR presentation device by way of the network interface, the custom XR stream to enable presentation of the selected subset of secondary content items in connection with the presentation of the primary content, wherein the presentation of the primary content occurs on a screen or stage concurrently with a presentation of the set dressing element that occurs outside the screen or stage.

16. The system of claim 15, wherein:
the primary content is 2D video content;
the processor is further configured to execute the instructions to transmit, to the XR presentation device by way of the network interface and together with the custom XR stream, the 2D video content to enable presentation of the 2D video content on the screen; and
the screen is implemented as a television screen.

17. The system of claim 15, wherein the primary content is a live performance performed on the stage for viewing by a user of the XR presentation device at a location of the user and the XR presentation device.

18. A system comprising:
a network interface configured to communicate, by way of a network, with an extended reality (XR) system;
a memory storing instructions; and
a processor communicatively coupled to the memory and the network interface and configured to execute the instructions to:
determine a presentation context dataset indicating how the system is to present XR content in connection with a presentation of primary content;
receive, from the XR system and by way of the network interface, a non-custom XR stream that includes a set of secondary content items each configured for presentation as XR content that augments the presentation of the primary content;
extract, based on the presentation context dataset, a subset of secondary content items from the set of secondary content items included in the non-custom XR stream, wherein the extracted subset of secondary content items includes a set dressing element that includes a logo or title for the primary content to help set a scene in which the primary content is presented; and
provide the extracted subset of secondary content items to a display device configured to present the extracted subset of secondary content items in connection with the presentation of the primary content, wherein the presentation of the primary content occurs on a screen or stage concurrently with a presentation of the set dressing element that occurs outside the screen or stage.

19. The system of claim 18, wherein:
the primary content is 2D video content that is received from the XR system by way of the network together with the non-custom XR stream;
the processor is further configured to execute the instructions to provide the 2D video content to the display device for presentation on the screen; and
the screen is implemented as a television screen.

20. The system of claim 18, wherein the primary content is a live performance performed on the stage for viewing by a user of the system at a location of the user and the system.

* * * * *